United States Patent
Burgun et al.

(10) Patent No.: US 11,248,404 B2
(45) Date of Patent: Feb. 15, 2022

(54) FLUID TRANSFER HINGE

(71) Applicant: Lockheed Martin Corporation, Bethesda, MD (US)

(72) Inventors: Robert S. Burgun, Fort Worth, TX (US); Johannah E. Rather, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 80 days.

(21) Appl. No.: 16/774,972

(22) Filed: Jan. 28, 2020

(65) Prior Publication Data
US 2021/0230918 A1    Jul. 29, 2021

(51) Int. Cl.
| E05D 11/00 | (2006.01) |
| B64C 23/00 | (2006.01) |
| B64C 9/02 | (2006.01) |

(52) U.S. Cl.
CPC .............. *E05D 11/00* (2013.01); *B64C 9/02* (2013.01); *B64C 23/00* (2013.01); *E05Y 2201/10* (2013.01); *E05Y 2800/10* (2013.01); *E05Y 2800/12* (2013.01); *E05Y 2800/176* (2013.01); *E05Y 2900/502* (2013.01)

(58) Field of Classification Search
CPC . Y10T 16/5285; Y10T 16/557; Y10T 16/558; E05D 11/00; B64C 9/02; B64C 23/00; B64C 23/02; E05Y 2201/10; E05Y 2800/10; E05Y 2800/12; E05Y 2800/176; E05Y 2900/502
See application file for complete search history.

(56) References Cited

U.S. PATENT DOCUMENTS

| 1,765,693 | A | * | 6/1930 | Muend | F16L 27/0845 |
| | | | | | 285/181 |
| 3,355,695 | A | * | 11/1967 | Overesch | H01R 35/04 |
| | | | | | 439/31 |
| 3,460,857 | A | * | 8/1969 | Larkin | F16L 27/0845 |
| | | | | | 285/98 |
| 3,736,986 | A | * | 6/1973 | Magdars | A62C 13/006 |
| | | | | | 169/74 |
| 3,857,625 | A | * | 12/1974 | Crane | H01R 35/02 |
| | | | | | 439/31 |

(Continued)

FOREIGN PATENT DOCUMENTS

| AU | 2008202706 A1 * | 1/2009 | ............ F16L 27/093 |
| CN | 208137719 U * | 11/2018 | |

(Continued)

*Primary Examiner* — Chuck Y Mah
(74) *Attorney, Agent, or Firm* — Baker Botts L.L.P.

(57) ABSTRACT

In one embodiment, systems and methods include to fluid transfer hinge used to transfer fluid from one surface to another. The fluid transfer hinge comprises a first housing. The fluid transfer hinge further comprises a second housing, wherein the first housing is coupled to the second housing, wherein the first housing is rotatable about the second housing along a central axis of the fluid transfer hinge. The fluid transfer hinge further comprises a fluid inlet, wherein the fluid inlet is disposed about at least a portion of the thickness of the first housing. The fluid transfer hinge further comprises a fluid outlet, wherein the fluid outlet is disposed about at least a portion of the thickness of the second housing.

15 Claims, 2 Drawing Sheets

(56) References Cited

U.S. PATENT DOCUMENTS

| | | | | |
|---|---|---|---|---|
| 3,872,541 A * | 3/1975 | Peterson | ............. | E05D 11/0081 16/223 |
| 3,889,983 A * | 6/1975 | Freize | ................. | F16L 27/0828 285/13 |
| 4,437,690 A * | 3/1984 | Drath | ................. | F16L 27/0837 285/185 |
| 4,479,610 A * | 10/1984 | Etheridge | ........... | A01M 7/0089 239/171 |
| 4,535,938 A * | 8/1985 | Lindabury, Sr. | .... | F16L 27/0837 239/269 |
| 4,543,800 A * | 10/1985 | Mawby | ............... | E05D 11/0081 439/165 |
| 4,706,331 A | 11/1987 | Compton | | |
| 4,717,180 A * | 1/1988 | Roman | ................... | B60S 3/047 285/148.19 |
| 4,756,053 A | 7/1988 | Madden et al. | | |
| 4,802,605 A | 2/1989 | Salmon et al. | | |
| 5,101,624 A | 4/1992 | Nash et al. | | |
| 5,111,550 A | 5/1992 | LeBlanc | | |
| 5,255,849 A | 10/1993 | Mayer et al. | | |
| 5,586,431 A | 12/1996 | Thonebe et al. | | |
| 6,336,764 B1 * | 1/2002 | Liu | ........................ | A46B 11/06 15/144.1 |
| 6,425,149 B1 * | 7/2002 | Wang | .................... | E03C 1/0404 285/181 |
| 6,848,384 B2 * | 2/2005 | Higgins | .................. | B63B 59/08 114/222 |
| 7,001,095 B1 * | 2/2006 | Chen | .................... | A46B 11/066 401/275 |
| 7,137,173 B2 | 11/2006 | Sipple | | |
| 7,730,581 B2 | 6/2010 | Mirick | | |
| 8,714,598 B2 * | 5/2014 | Bohner | ................. | F16L 17/025 285/98 |
| 8,851,116 B1 * | 10/2014 | Zhadanov | ............. | F16K 5/0414 137/616.7 |
| 9,297,483 B2 * | 3/2016 | Wolff | .................... | F16L 33/2071 |
| 9,700,909 B2 * | 7/2017 | Leber | ...................... | B05B 15/65 |
| 2004/0107538 A1 | 6/2004 | Ciacci et al. | | |
| 2008/0018212 A1 * | 1/2008 | Spearing | ............ | H05K 7/20645 312/236 |
| 2014/0115825 A1 * | 5/2014 | Park | ........................ | E05D 11/00 16/223 |
| 2019/0021951 A1 * | 1/2019 | Pavlik | ................... | A61J 1/2048 |

FOREIGN PATENT DOCUMENTS

| | | | | |
|---|---|---|---|---|
| CN | 208202916 U | * | 12/2018 | ............. F28F 9/262 |
| FR | 2968696 A1 | * | 6/2012 | ......... E05D 11/0081 |
| GB | 1064441 A | * | 4/1967 | ............. F28F 9/262 |
| KR | 20020032938 A | * | 5/2002 | |

* cited by examiner

FLUID TRANSFER HINGE

TECHNICAL FIELD

This disclosure generally relates to fluid transfer, and more specifically to a fluid transfer hinge used to transfer fluid from one surface to another.

BACKGROUND

Fluid flow along an aircraft wing's many components, such as a high lift control surface, can become separated thereby leading to increased drag and reduced lift. Typically, there are predrilled holes along the wing to control the flow of air. When there is a distinct change along the surface, such as at a high lift control surface (for example, an angled wing flap), the fluid flow can separate and become turbulent. There exists a problem wherein the current hardware used at the hinge between the wing and the high lift control surface does not efficiently transfer fluid from the upstream side of the hinge to the downstream side.

BRIEF DESCRIPTION OF THE DRAWINGS

To assist in understanding the present disclosure, reference is now made to the following description taken in conjunction with the accompanying drawings, in which.

DETAILED DESCRIPTION

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4B, where like numbers are used to indicate like and corresponding parts.

Figure 1:
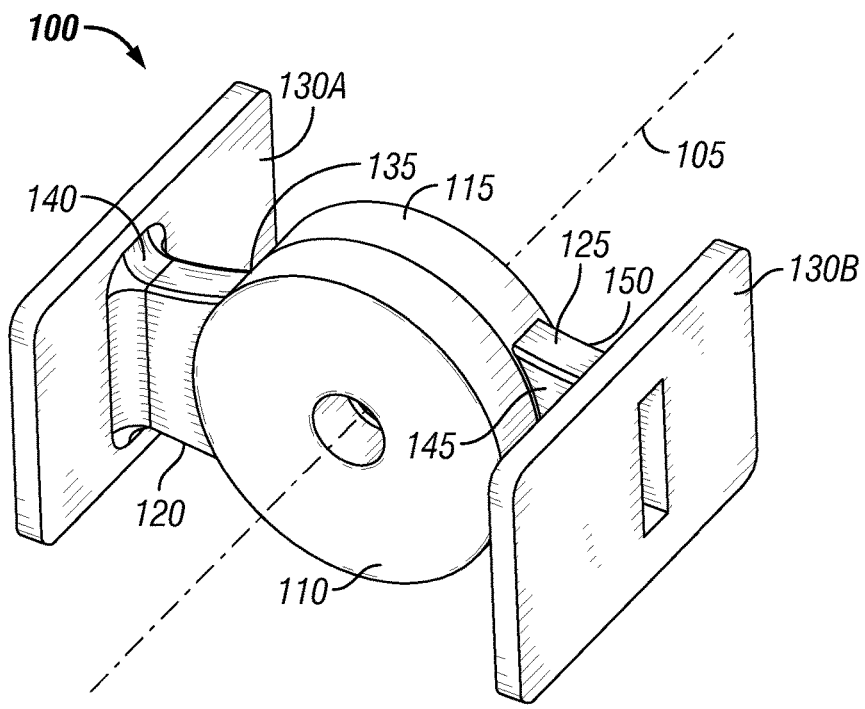
FIG. 1 illustrates an example fluid transfer hinge, according to certain embodiments.

FIG. 1 illustrates an embodiment of a fluid transfer hinge 100. The fluid transfer hinge 100 may be configured to rotate about a central axis 105 to provide for a transfer of fluid from upstream towards a high lift control surface (further illustrated on FIGS. 4A-4B) to reduce separated fluid flow downstream. Without limitations, the fluid transfer hinge 100 may be configured to be compatible with any suitable fluids including, but not limited to, air, coolant, refrigerant, lubricant, and combinations thereof. In embodiments, the fluid transfer hinge 100 may comprise any suitable material and may be any suitable size, height, shape, and combinations thereof. Without limitations, the fluid transfer hinge 100 may comprise aluminum, titanium, steel, Inconel, any other suitable metals, nonmetals, plastics, composites, and combinations thereof. The fluid transfer hinge 100 may comprise a first housing 110, a second housing 115, a fluid inlet 120, and a fluid outlet 125. As illustrated, the fluid inlet 120 and the fluid outlet 125 may be coupled to flanges 130A and 130B, respectively. As further discussed below on FIGS. 4A-4B, the flanges 130A, 130B may be coupled to a wing of an aircraft and to a high lift control surface that is rotatable about the wing. Without limitations the flanges 130A, 130B may be affixed to the corresponding wing and high lift control surface via threading, adhesives, welding, fasteners, and combinations thereof. In embodiments, the flanges 130A, 130B may be any suitable size, height, shape, and combinations thereof. As illustrated, the flanges 130A, 130B may be rectangular in shape. In one or more embodiments, the flanges 130A, 130B may be actuated to rotate when the first housing 110 and second housing 115 rotate about each other.

In one or more embodiments, the first housing 110 may be any suitable size, height, shape, and combinations thereof. Without limitations, the first housing 110 may have a circular cross-section with an outer diameter and an inner diameter. In one or more embodiments, the outer diameter and the inner diameter may be concentric about the central axis 105. In embodiments, the second housing 115 may be any suitable size, height, shape, and combinations thereof. Without limitations, the second housing 115 may have the same shape and dimensions as the first housing 110. For example, the outer diameter and the inner diameter of the second housing 115 may be the same as the outer diameter and the inner diameter of the first housing 110.

The first housing 110 and the second housing 115 may have a predetermined thickness of any suitable measurement. In one or more embodiments, the fluid inlet 120 may be disposed about any suitable side of the first housing 110 along the thickness of the first housing 110. In one or more embodiments, the width of the fluid inlet 120 may be equivalent to at least a portion of the thickness of the first housing 110. In embodiments, the fluid inlet 120 may be a conduit allowing fluid communication between an interior of the first housing 110 and an exterior of the first housing 110. In embodiments, the fluid inlet 120 may be any suitable size, height, shape, and combinations thereof. Without limitations, the fluid inlet 120 may comprise a rectangular cross-section. In embodiments, a first side 135 of the fluid inlet 120 may be curvilinear and may align with at least a portion of the circumference of the first housing 110. The fluid inlet 120 may comprise a second side 140 opposite of the first side 135 that is coupled to the flange 130A.

Similarly, in one or more embodiments, the fluid outlet 125 may be disposed about any suitable side of the second housing 115 along the thickness of the second housing 115. In one or more embodiments, the width of the fluid outlet 125 may be equivalent to at least a portion of the thickness of the second housing 115. In embodiments, the fluid outlet 125 may be a conduit allowing fluid communication between an interior of the second housing 115 and an exterior of the second housing 115. In embodiments, the fluid outlet 125 may be any suitable size, height, shape, and combinations thereof. Without limitations, the fluid outlet 125 may comprise a rectangular cross-section. In embodiments, a first side 145 of the fluid outlet 125 may be curvilinear and may align with at least a portion of the circumference of the second housing 115. The fluid outlet 125 may comprise a second side 150 opposite of the first side 145 that is coupled to the flange 130B.

Figure 2:
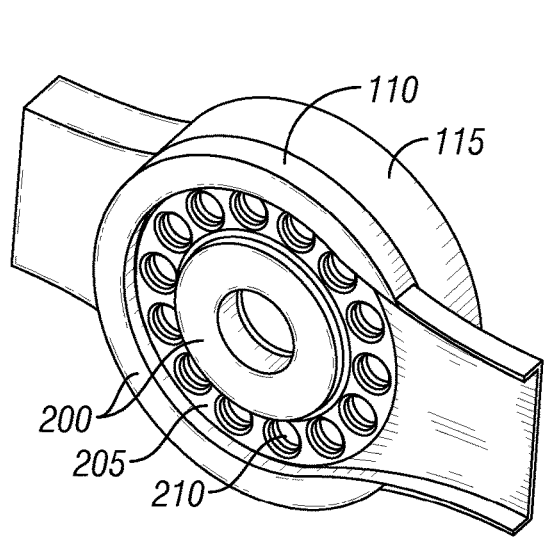
FIG. 2 illustrates a cross-section of a first housing of the fluid transfer hinge in FIG. 1, according to certain embodiments.

FIG. 2 illustrates a cross-sectional view of the first housing 110 coupled to the second housing 115. As illustrated, the first housing 110 may comprise a hollow portion within the interior of the first housing 110 between a first side 200 and a second side 205 of the first housing 110. Without limitations, the hollow portion may comprise an outer diameter and an inner diameter, wherein the outer diameter is smaller than the outer diameter of the first housing 110, and the inner diameter is greater than the inner diameter of the first housing 110. In one or more embodiments, there may be a plurality of holes 210 disposed on the second side 205 of the first housing 110 between the inner diameter and outer diameter of the hollow portion. As illustrated, the plurality of holes 210 may be disposed uniformly throughout the hollow portion. In other embodiments, the plurality of holes 210 may be disposed in any suitable configuration.

Figure 3:
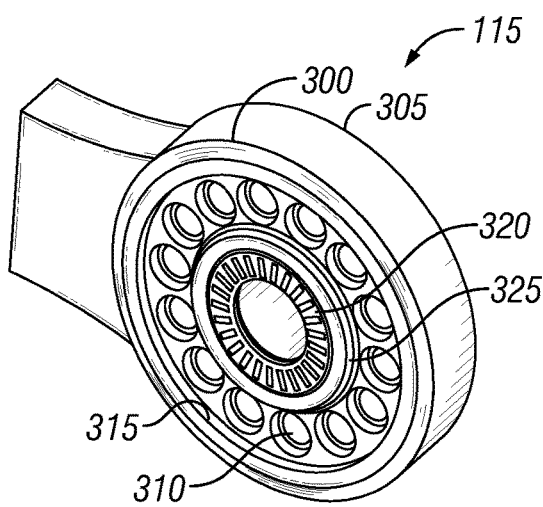
FIG. 3 illustrates a cross-section of a second housing of the fluid transfer hinge in FIG. 1, according to certain embodiments.

FIG. 3 illustrates a cross-sectional view of the second housing 115. As illustrated, the second housing 115 may also comprise a hollow portion within the interior of the second housing 115 between a first side 300 and a second side 305 of the second housing 115. Without limitations, the hollow portion may comprise an outer diameter and an inner diameter, wherein the outer diameter is smaller than the outer diameter of the second housing 115, and the inner diameter is greater than the inner diameter of the second housing 115. In one or more embodiments, there may be a plurality of holes 310 disposed about the first side 300 of the second housing 115 between the inner diameter and outer diameter of the hollow portion. As illustrated, the plurality of holes 310 may be disposed uniformly throughout the hollow portion. In other embodiments, the plurality of holes 310 may be disposed in any suitable configuration. In embodiments, the hollow portion of the second housing 115 may be concentric to and mirror the hollow portion of the first housing 110. In further embodiments, the plurality of holes 310 may be disposed on the first side 300 of the second housing 115 in the same, if not similar, configuration as the plurality of holes 210 disposed on the second side 205 of the first housing 110.

As illustrated, the second housing 115 may further comprise a first pressure seal 315, a thrust bearing 320, and a second pressure seal 325. In embodiments, the first pressure seal 315 and the second pressure seal 325 may be any suitable sealants. Without limitations, the first pressure seal 315 and the second pressure seal 325 may be O-rings. In embodiments, the first pressure seal 315 may be disposed along the outer diameter of the hollow portion of the second housing 115, and the second pressure seal 325 may be disposed along the inner diameter of the hollow portion of the second housing 115. This may effectively seal the second housing 115 to the first housing 110 when they are coupled together and may permit fluid communication between the plurality of holes 210 of the first housing 110 and the plurality of holes 310 of the second housing 115.

The thrust bearing 320 may be disposed within the second housing 115. Without limitations, any suitable type of rotary bearing may be used as the thrust bearing 320. In one or more embodiments, the thrust bearing 320 may be disposed in between the second housing 115 and the first housing 110 (referring to FIG. 2) when the second housing 115 is coupled to the first housing 110. In embodiments, the thrust bearing 320 may be configured to support an axial load (for example, along central axis 105) while permitting rotation between the second housing 115 and the first housing 110.

Figure 4A:
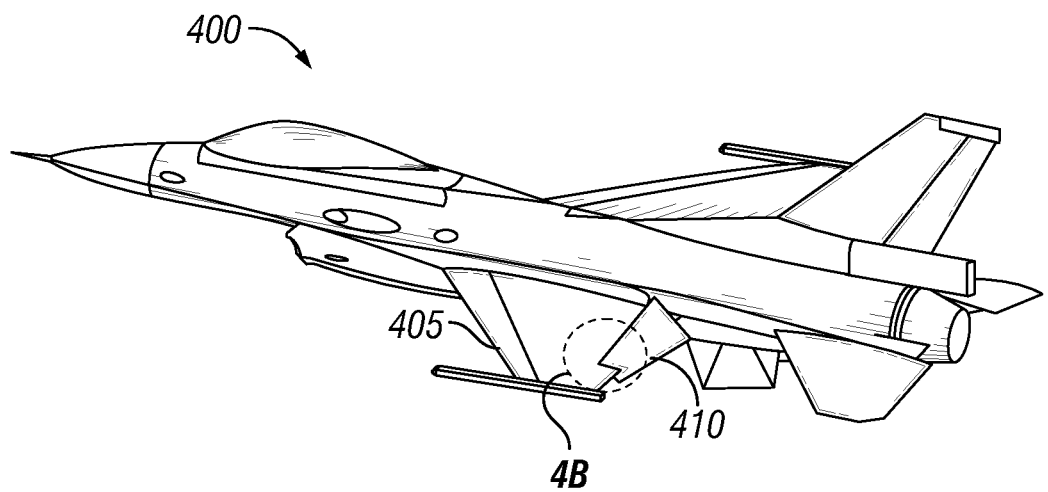
FIG. 4A illustrates a vehicle, according to certain embodiments.
Figure 4B:
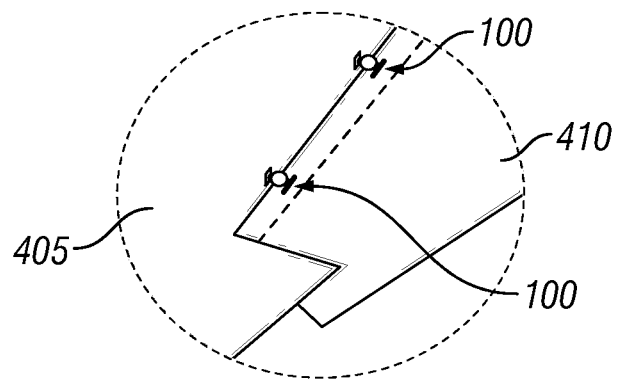
FIG. 4B illustrates a subset of the vehicle in FIG. 3 utilizing at least one fluid transfer hinge, according to certain embodiments.

FIGS. 4A-4B illustrate an example vehicle 400 utilizing the fluid transfer hinge 100. Without limitations, vehicle 400 may be any type of vehicle, including an aircraft, a landcraft, a watercraft, a train, a hovercraft, and a helicopter. Further, certain embodiments may be applicable to surfaces of stationary structures, such as buildings or other structures. As illustrated, the vehicle 400 may comprise a wing 405 and a high lift control surface 410. During operations, the high lift control surface 410 may rotate about the side which is coupled to the wing 405. In embodiments, during rotation, there may be any suitable angle between the wing 405 and the high lift control surface 410. As illustrated clearer on FIG. 4B, one or more fluid transfer hinges 100 may be disposed between the wing 405 and the high lift control surface 410. In embodiments, the fluid inlet 120 (referring to FIG. 1) may be coupled to the wing 405 and may allow fluid travelling along the wing 405 to enter into the fluid transfer hinge 100. Without limitations, the fluid inlet 120 may be coupled to the wing 405 by affixing the flange 130A (referring to FIG. 1) to the wing 405. In embodiments, the fluid outlet 125 (referring to FIG. 1) may be coupled to the high lift control surface 410 and may allow fluid to exit from the fluid transfer hinge 100 and travel further along the high lift control surface 410. Without limitations, the fluid outlet 125 may be coupled to the high lift control surface 410 by affixing the flange 130B (referring to FIG. 1) to the high lift control surface 410. There may be a reduction in the separation of fluid as the fluid travels from the wing 405 to the high lift control surface 410 via the fluid transfer hinge 100.

Technical advantages of this disclosure may include one or more of the following. Previous structures and methods have utilized manifolds, swivel fittings, flexible hose, and other hardware to operate both as a hinge and to transport fluid across the hinge, which fatigue over time. The fluid transfer hinge 100 described herein may provide a reduced part count, complexity, and volume. The present fluid transfer hinge 100 may reduce the separation of the fluid flow from the wing 405 to the high lift control surface 410. This may reduce the amount of drag and increase the lift produced by the high lift control surface 410.

The present disclosure may provide numerous advantages, such as the various technical advantages that have been described with respective to various embodiments and examples disclosed herein. Other technical advantages will be readily apparent to one skilled in the art from the following figures, descriptions, and claims. Moreover, while specific advantages have been enumerated in this disclosure, various embodiments may include all, some, or none of the enumerated advantages.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A fluid transfer hinge, comprising:
    a first housing comprising a first hollow portion within an interior of the first housing between a first side of the first housing and a second side of the first housing;
    a second housing comprising a second hollow portion within an interior of the second housing between a first side of the second housing and a second side of the second housing, wherein the first housing is coupled to the second housing and is rotatable about the second housing along a central axis of the fluid transfer hinge;
    a thrust bearing disposed within the second housing in between the second housing and the first housing, the thrust bearing configured to:
        support an axial load along the central axis of the fluid transfer hinge; and
        permit rotation between the first housing and the second housing about the central axis;
    a fluid inlet coupled to the first housing and configured to allow fluid communication between the interior of the first housing and an exterior of the first housing; and
    a fluid outlet coupled to the second housing and configured to allow fluid communication between the interior of the second housing and an exterior of the second housing;
    wherein the fluid transfer hinge is configured to permit a fluid to enter the first housing via the fluid inlet, flow through the first hollow portion of the first housing and into the second hollow portion of the second housing, and exit the second housing via the fluid outlet.

2. The fluid transfer hinge of claim 1, wherein the first housing comprises a circular cross-section with an outer diameter and an inner diameter.

3. The fluid transfer hinge of claim 2, wherein the second housing comprises a circular cross-section with an outer diameter and an inner diameter.

4. The fluid transfer hinge of claim 3, wherein the outer diameter and the inner diameter of the first housing and the second housing are concentric about the central axis.

5. The fluid transfer hinge of claim 1, wherein a first side of the fluid inlet is curvilinear to align with at least a portion of the circumference of the first housing.

6. The fluid transfer hinge of claim 1, wherein a first side of the fluid outlet is curvilinear to align with at least a portion of the circumference of the second housing.

7. The fluid transfer hinge of claim 1, wherein a second side of the fluid inlet is coupled to a flange.

8. The fluid transfer hinge of claim 1, wherein a second side of the fluid outlet is coupled to a flange.

9. The fluid transfer hinge of claim 1, wherein the first hollow portion comprises an outer diameter and an inner diameter, wherein the outer diameter of the first hollow portion is smaller than the outer diameter of the first housing, and the inner diameter of the first hollow portion is greater than the inner diameter of the first housing.

10. The fluid transfer hinge of claim 9, further comprising a plurality of holes disposed on the second side of the first housing between the inner diameter and the outer diameter of the first hollow portion, wherein the plurality of holes are disposed uniformly throughout the first hollow portion.

11. The fluid transfer hinge of claim 9, wherein the second hollow portion comprises an outer diameter and an inner diameter, wherein the outer diameter of the second hollow portion is smaller than the outer diameter of the second housing, and the inner diameter of the second hollow portion is greater than the inner diameter of the second housing.

12. The fluid transfer hinge of claim 11, further comprising a plurality of holes disposed on the first side of the second housing between the inner diameter and the outer diameter of the second hollow portion, wherein the plurality of holes are disposed uniformly throughout the second hollow portion.

13. The fluid transfer hinge of claim 11, further comprising:
    a first pressure seal disposed along the outer diameter of the second hollow portion of the second housing; and
    a second pressure seal disposed along the inner diameter of the second hollow portion of the second housing;
    wherein the first pressure seal and the second pressure seal are configured to:
        seal the second housing to the first housing; and
        permit fluid communication between the first hollow portion of the first housing and the second hollow portion of the second housing.

14. The fluid transfer hinge of claim 13, wherein the first pressure seal and the second pressure seal are O-rings.

15. The fluid transfer hinge of claim 1, wherein the fluid transfer hinge is comprised of a material selected from a group consisting of: aluminum, titanium, steel, Inconel, plastics, composites, or a combination thereof.

* * * * *